United States Patent [19]

Ichinose et al.

[11] 4,224,379
[45] Sep. 23, 1980

[54] PEELABLE BONDED STRUCTURES AND PROCESS FOR PREPARING SAME

[75] Inventors: Isao Ichinose, Hiratsuka; Fumio Mori, Yokohama; Go Kunimoto, Fujisawa, all of Japan

[73] Assignee: Toyo Seikan Kaisha, Ltd., Tokyo, Japan

[21] Appl. No.: 964,615

[22] Filed: Nov. 29, 1978

[30] Foreign Application Priority Data

Dec. 8, 1977 [JP] Japan .................. 52-146607

[51] Int. Cl.² .......... B32B 15/08; B32B 27/32
[52] U.S. Cl. .................. 428/461; 156/247; 156/334; 427/388.1; 428/344; 428/353; 428/516; 428/523; 428/914
[58] Field of Search .................. 428/461–463, 428/516, 517, 523, 914, 352, 353, 344; 156/247, 334; 427/388 R

[56] References Cited

U.S. PATENT DOCUMENTS

| 3,233,770 | 2/1966 | Waters | 215/40 |
|---|---|---|---|
| 3,282,765 | 11/1966 | Pine et al. | 156/247 X |
| 3,361,281 | 1/1968 | Kehe | 215/39 |
| 3,487,124 | 12/1969 | Yeshin | 260/831 |
| 3,493,453 | 2/1970 | Ceresa et al. | 156/334 X |
| 3,581,690 | 6/1971 | Zapata | 113/80 |
| 3,633,781 | 1/1972 | Zapata | 215/39 |
| 4,049,904 | 9/1977 | Hori et al. | 428/461 X |
| 4,092,452 | 5/1978 | Hori et al. | 428/461 X |
| 4,113,539 | 9/1978 | Hotta et al. | 428/461 X |
| 4,125,739 | 11/1978 | Bow | 428/461 |

Primary Examiner—Harold Ansher

[57] ABSTRACT

A peelable bonded structure comprising a metal substrate and a polyolefin layer bonded to the substrate through a primer layer, wherein the primer layer is a composition comprising (A) a modified olefin resin having a carbonyl group concentration of 0.01 to 200 milliequivalents per 100 g of the olefin resin and (B) a coating film-forming base resin at an (A)/(B) weight ratio of from 0.1/99.8 to 70/30. The primer layer has in at least one first planar region thereof a multi-layer distribution structure having a resin concentration gradient in the thickness direction such that the modified olefin resin (A) is distributed predominantly in the portion of the primer layer contiguous to the polyolefin layer and the base resin (B) is distributed predominantly in the portion of the primer layer contiguous to metal substrate, and in at least one second planar region the modified olefin resin (A) is distributed in the portion of the primer layer contiguous to the polyolefin layer at a lower distribution ratio.

30 Claims, 3 Drawing Figures

PEELABLE BONDED STRUCTURES AND PROCESS FOR PREPARING SAME

BACKGROUND OF THE INVENTION

This invention relates to peelable bonded structures and processes for preparing them. More particularly, it relates to a bonded structure in which a metal substrate and a polyolefin layer are tightly bonded together in a specific region (bonded region), and in the region (easily peelable region) other than said bonded region, the metal substrate and polyolefin layer are maintained in the easily peelable bonded state or non-bonded state.

Bonded structures comprising a plurality of articles which are bonded together to such an extent that they can be peeled from each other are often required in various fields, especially in the packaging of materials involving vessels, vessel closures and sealing materials.

Sealing materials such as crown closures and other vessel closures, have heretofore been prepared by coating a surface-protecting paint onto a metal sheet, forming the coated metal sheet into a crown shell, cap shell or the like and bonding a packing material to the inner face of the formed article. In premium sales of bottled beverages and the like, systems have been adopted in which a prize or premium is given for a predetermined number of packings or a packing having a winning mark. In the production of crown closures or caps for use in such premium sales, it is first of all required that packings be easily peelable from crown shells or cap shells. However, it also is required that packings be bonded to crown shells or cap shells to such an extent that the packings are not peeled during the preparation of such crown closures or caps, during their transportation or during the step of sealing the bottles. Also, crown or cap shells should have adequate corrosion resistance to the contents of the vessel and they should be able to withstand such processing as crimping or roll-on. Also, from the sanitary viewpoint, it is not permissable to print the surface of a packing which directly contacts a beverage. In general, a packing per se is applied to the inner face of a crown shell or cap in the state where it has a certain flowability. Accordingly, it is desirable that when a packing is peeled off, a printing ink layer formed on the inner face of a crown shell or cap is transferred in the state adhering to the packing.

These special peeling characteristics are also required for cans having so-called "easy-open"-type mechanisms. For example, a can vessel having an easy-open end, which is prepared by forming one or more openings necessary for drinking through a can end-member composed of a surface-protecting coating-applied metal sheet and bonding a peel piece composed of an organic resin-coated metal foil or sheet over said opening or openings, is known in the art. Also, in such easy-open end structures, excellent adhesion and sealing are required between the can end member and peel piece during storage, but when the can vessel is opened, the peel piece should be easily peelable from the can end member without risk of breaking the peel piece.

In order to form a bonded structure of two articles which can be peeled from each other in the bonded area without breakage of the articles, it is necessary that the peel strength of the bonded region should be within a certain range, generally about 0.02 to 5 kg/cm. If the peel strength is lower than 0.02 kg/cm, peeling is undesirably found to occur before the articles are intentionally peeled. On the other hand, when the peel strength is greater than 5 kg/cm, it is generally difficult or impossible to effect peeling at the bonded interface without breaking the bonded articles.

Furthermore, in order to easily peel two bonded articles from each other at their bonded interface, it is necessary that peeling be facilitated in that portion of the bonded interface where peeling is initiated.

Accordingly, it is an object of the present invention to provide a novel peelable bonded structure comprising a metal substrate and a polyolefin layer bonded to the metal substrate such that the bond strength between the substrate and the polyolefin layer varies at predetermined regions with respect to the plane direction of the bonded structure.

Another object of the invention is to provide a peelable bonded structure in which a metal substrate and a polyolefin layer are bonded together to such an extent that the bonded structure as a whole has a peel strength of between about 0.02 and 5 kg/cm or so that interlaminar peeling can easily occur between the metal substrate and the polyolefin layer in the peeling-initiating region.

Another object of the invention is to provide a vessel closure comprising a metal substrate such as a crown shell or cap shell and a polyolefin packing material peelably bonded to the metal substrate.

Another object of the invention is to provide an easy-open end structure comprising a can end member having an opening and a peel piece peelably bonded to the can end member.

Yet another object of the invention is to provide a process for producing the aforementioned peelable bonded structures.

These and other objects of the invention as well as a fuller understanding of the advantages thereof can be had by reference to the following detailed description, drawings and claims.

SUMMARY OF THE INVENTION

The foregoing objects are achieved according to the present invention by the discovery that, when a metal substrate and an polyolefin layer are bonded together through a primer coating layer comprising a certain modified olefin resin (A) and a coating film forming base resin (B), if in a first planar region there is formed a multi-layer distribution structure wherein the modified olefin resin (A) in the primer layer is distributed predominantly in the portion of the primer layer contiguous to the polyolefin layer and in the other planar region the modified olefin resin (A) in the primer layer is distributed in the portion contiguous to the polyolefin layer at a distribution ratio lower than the distribution ratio of the modified olefin resin in the portion contiguous to the polyolefin layer in said first region, it is possible to form a relatively tightly bonded region and a relatively weakly bonded region between the metal substrate and the polyolefin layer. There is thus provided a novel bonded structure in which a polyolefin layer is bonded to a metal substrate at a peel strength sufficient to prevent accidental peeling between the metal substrate and the polyolefin layer and whereby the polyolefin layer can be easily peeled from the metal substrate when desired.

In accordance with one aspect of the present invention, there is provided a peelable bonded structure comprising a metal substrate and a polyolefin layer bonded to the metal substrate through a primer layer, wherein said primer layer contains a composition comprising (A) a modified olefin resin or polymer having a carbonyl group concentration of between about 0.01 and 200 millieqivalents per 100 g of the polymer and (B) a coating film-forming base resin at an (A)/(B) weight ratio of from about 0.2/99.8 to 70/30.

In the bonded structure of the present invention, the aforesaid first region of the primer layer is characterized in that (1) the distribution ratio of the modified olefin resin is at least about 50% by weight, and preferably at least about 70% by weight in the topmost sub-layer ($L_S$), and (2) the distribution ratio of the modified olefin resin is not higher than about 10% by weight, and preferably not higher than about 5% by weight, in the lowermost sub-layer ($L_B$).

The distribution ratio, Dx, is defined by the following formula:

$$D_x = 10000\, W_X/(W)(C_A)$$

wherein W is the weight of the primer layer per unit surface area (mg/dm$^2$), $C_A$ is the average % by weight of the modified olefin resin in the primer layer, and $W_X$ is the weight per unit area (mg/dm$^2$) of the modified olefin resin in each sub-layer.

In accordance with another aspect of the invention, there is provided a process for preparing peelable polyolefin-metal bonded structures comprising a metal substrate and a polyolefin layer heat-bonded to the metal substrate through a primer coating layer, said process comprising applying a masking layer containing a distribution controlling agent for a modified olefin resin onto at least one predetermined region on the surface of the metal substrate prior to application of a primer paint, applying to the masking layer-treated surface of the metal substrate a primer paint comprising the aforementioned modified olefin resin and coating film-forming base resin in a solvent system containing at least 70% by weight of a solvent component having a solubility parameter of from about 8.0 to 9.5 and wherein (in the case of mixed solvents) the difference in boiling points between the highest and lowest boiling solvent components is at least about 20° C., and curing the applied primer paint, whereby the modified olefin resin is distributed predominantly in the surface area portion of the primer layer in the region other than the masking layer-applied region and the modified olefin resin is distributed in the surface portion of the primer layer in the masking layer-applied region at a distribution ratio which is lower than the distribution ratio of the modified olefin resin in the surface portion of the primer layer in the region other than the masking layer-applied region.

Metals and alloys such as iron, steel, copper, aluminum, zinc, stainless steel, bronze, cupronickel, duralumin and die casting alloys can be used as the metal substrate in the present invention. Further, the metal substrate can be composed of steel plated with zinc, tin, chromium or the like, or steel treated with phosphoric acid or chromic acid or electrolytically treated with chromic acid. The shape of the metal substrate is not critical. For example, the metal substrate can be in the form of a metal foil, rolled thin plate, panel, sheet, rod, beam, other formed material, wire, twisted wire, crown shell, cap, other vessel, a construction material or vehicle construction. The present invention is preferably applied to an untreated steel plate (so-called black plate), a steel plate whose surface has been treated with phosphoric acid or chromic acid or electrolytically treated with chromic acid, or a steel plate whose surface has been electrolytically plated or fusion-plated with tin, zinc or the like. When the present invention is applied to these metal substrates, their bondability to a polyolefin can be effectively enhanced while remarkably improving the corrosion resistance of the substrates per se. In order to enhance the anti-corrosive effect, the surface of the metal substrate can be coated in advance with any known primer such as an epoxy-amino resin, a phenol-epoxy resin, an epoxy-urea resin, a phenol-epoxy-vinyl resin, an epoxy-vinyl resin or the like.

An important feature of the present invention is that when a polyolefin is bonded to a metal substrate through a primer layer, by using a combination of a specific modified olefin resin (A) and a coating film-forming base resin (B) as the primer layer, in a specific region along the plane direction in the primer layer there is manifested a multi-layer distribution structure having concentration gradients of two components in the thickness direction such that the base resin (B) is distributed predominently in the portion of the primer layer contiguous to the metal substrate and the modified olefin resin (A) is distributed predominantly in the portion contiguous to the polyolefin layer. In the other region along the plane direction, because of the presence of the masking layer described hereinbelow, the modified olefin resin (A) is distributed in the portion of the primer layer contiguous to the polyolefin layer at a distribution ratio lower than the distribution ratio in the portion contiguous to the polyolefin layer in the multi-layer distribution structure-manifested region.

In another feature of the present invention, the olefin resin or polymer (A) is modified with carbonyl groups (—CO—) at a concentration of about 0.01 to 200 milliequivalents per 100 g of the polymer, preferably about 0.1 to 70 milliequivalents per 100 g of the polymer and has a degree of crystallinity of at least about 50% and preferably at least about 70%, in order to achieve the aforementioned multi-layer distribution structure in the primer layer and to improve the mechanical bonding strength between the polyolefin layer and the primer layer, such bonding strength being resistant to moisture or hot water and permitting the processability of the bonded area.

The degree of crystallinity in the modified olefin resin significantly influences the formation in the primer layer of the aforementioned multi-layer distribution structure having specific concentration gradients in the thickness direction. The degree of crystallinity referred to herein is determined according to the X-ray diffraction method described by S. L. Aggarwal and G. D. Tilley in the Journal of Polymer Science, 18, pp. 17–26 (1955). When the degree of crystallization of the modified resin is lower than about 50% it is possible to disperse such resin into the coating film-forming base resin but it is very difficult to distribute the modified olefin resin predominantly in the top face portion of the primer layer, i.e., in the portion contiguous to the polyolefin layer.

The concentration of carbonyl groups in the modified olefin resin significantly influences the compatibility or affinity of the such resin with the coating film-forming base resin and the polyolefin layer as well as the formation in the primer layer of the multi-layer distribution structure having the prescribed concentration gradients in the thickness direction. When the carbonyl group concentration in the modified olefin resin is below the above-mentioned range, the compatibility of such resin with the base resin is lowered and as a result, even if the modified olefin resin is distributed predominantly in the top face portion of the primer layer, no satisfactory bonding strength can be achieved between the polyolefin layer and the primer layer.

If the carbonyl group concentration in the modified olefin resin exceeds the above-mentioned range, the result is often insufficient compatibility or affinity of such resin with the polyolefin layer, and satisfactory bonding strength between the polyolefin layer and the primer layer cannot be achieved. Also, because of excessive compatibility or affinity of the modified olefin resin with the base resin, which sometimes occurs in such circumstances, it is difficult to form a multi-layer distribution structure in which the modified olefin resin is distributed predominantly in the top face portion of the primer layer.

In contrast, when a modified olefin resin having a degree of crystallinity of at least 50% and containing carbonyl groups at a concentration of 0.01 to 200 milliequivalents per 100 g of polymer is used as the modified olefin resin according to the present invention, it is possible to achieve a novel multi-layer distribution structure in the primer layer in which the modified olefin resin is distributed predominantly in the upper portion of the primer layer and the base resin is distributed predominantly in the lower portion, and it is possible to bond the polyolefin layer to the metal substrate with maximum strength through the specific modified olefin resin-base resin distribution structure in the primer layer. Furthermore, although incorporation of a modified olefin resin into the primer layer normally tends to reduce the corrosion resistance of the metal substrate, if the above-mentioned multi-layer distribution is manifested in the primer layer according to the present invention, it is possible to impart to the metal substrate a high corrosion resistance comparable to the corrosion resistance attainable by a primer layer free of a modified olefin resin.

In the present invention, any of the products formed by incorporating known carbonyl group-containing ethylenically unsaturated monomers into main or side chains of olefin resins by known treatments such as graft copolymerization, block copolymerization, random polymerization and terminal treatment can be used as the modified olefin resin in the present invention, consistent with the foregoing requirements.

As the carbonyl group-containing ethylenically unsaturated monomer, there can be used monomers having a carbonyl group (—CO—) derived from a carboxylic acid, a carboxylic acid salt, a carboxylic anhydride, a carboxylic acid ester, a carboxylic acid amide or imide, an aldehyde or a ketone; monomers having a cyano group (—CN); monomers having a hydroxyl group; monomers having an ether group and monomers featuring an oxirane ring

These carbonyl group-containing monomers can be used singly or in the form of a mixture of two or more of them. Examples of monomers suitable for use in the invention include ethylenically unsaturated carboxylic acids such as acrylic acid, methacrylic acid, maleic acid, fumaric acid, crotonic acid, itaconic acid, citraconic acid and 5-norbornene-2,3-dicarboxylic acid; ethylenically unsaturated carboxylic anhydrides such as maleic anhydride, citraconic anhydride, 5-norborne-2,3-dicarboxylic anhydride and tetrahydrophthalic anhydride; ethylenically unsaturated esters such as ethyl acrylate, methyl methacrylate, 2-ethylhexyl acrylate, monoethyl maleate, diethyl maleate, vinyl acetate and vinyl propionate, gamma-hydroxypropylmethacrylate, beta-hydroxyethylacrylate and glycidyl methacrylate; ethylenically unsaturated amides and imides such as acrylamide, methacrylamide and maleimide; ethylenically unsaturated aldehydes and ketones such as acrolein, methacrolein, methylvinyl ketone and butylvinyl ketone.

Among the foregoing monomers, ethylenically unsaturated carboxylic acids and ethylenically unsaturated carboxylic anhydrides are especially preferred for use in the present invention. These monomers can be used singly or in combination with other monomers for modification of the olefin resin.

Examples of olefin resins suitable for use in the present invention include polymers of ethylene, propylene, butene-1, pentene-1 and 4-methylpentene-1. These olefins can be used singly or in the form of a mixture of two or more of them.

In order to modify an olefin resin so that the foregoing requirements are satisfied, for example, in case of a grafting treatment, it is necessary to select an olefin resin having a degree of crystallinity of at least 50% as the starting resin and to conduct the grafting treatment under conditions such that the degree of crystallinity of the resin is not reduced below 50%. For this reason, high density polyethylene or isotactic polypropylene or a highly crystalline ethylene-propylene copolymer is preferably employed as the trunk polymer. Further, under such mild grafting conditions as will not cause any substantial reduction of the degree of crystallinity, medium density polythelene and low density polyethylene having a degree of crystallinity higher than 50% can also be used. In carrying out the grafting treatment, for example, when a trunk polymer composed of an olefin resin is contacted with a carbonyl group-containing ethylenically unsaturated monomer in the presence of a radical initiator or under free radical initiating conditions, a modified olefin resin is readily obtained. The trunk polmer can be contacted with the monomer in a homogenous solution system, a heterogenous solid-liquid or solid-gas system or a homogenous melt system. As the free radical initiators, one can use, for example, organic peroxides such as dicumyl peroxide, t-butyl hydroperoxide, dibenzoyl peroxide and dilauroyl peroxide and azonitriles such as azobisisobutyronitrile and azobisisopropionitrile. These initiators can be used in conventional catalytic amounts. Suitable free radical initiating means include for example, ionizins radiation such as X-rays, gamma-rays and electron beams; ultraviolet radiation, combinations of ultraviolet rays with sensitizers, and mechanical radical initiating means such as kneading (mastication) and ultrasonic vibration.

In the case of reaction in a homogenous system, the olefin resin, monomer and initiator are dissolved in an aromatic solvent such as toluene, xylene or tetralin wherein the grafting reaction is carried out. The resulting modified olefin resin is recovered as a precipitate. In the case of reaction in a heterogenous system, a powder of the olefin resin is contacted with the monomer or a dilute solution of the monomer under ionizing radiation to effect grafting. In the case of reaction in a homogenous melt system, a blend of the olefin resin and monomer, optionally together with an initiator, is melt-extruded by an extruder or kneader to form a modified olefin resin. In each case, the resulting modified olefin resin can be subjected to a purifying treatment such as washing or extraction to remove the unreacted monomer, homopolymer, or the residual initiator. Further, when the resulting modified olefin resin is crystallized from an aromatic solvent such as mentioned above and the crystallization conditions are appropriately controlled, the particle size can be adjusted.

Another type of modified olefin resin having the above-mentioned carbonyl group concentration is oxidized polyethylene prepared by oxidizing polyethylene or a copolymer composed mainly of ethylene in the molten or solution state.

From the viewpoints of the compatibility with the base resin (B) and ease of formation of the aforementioned multi-layer distribution structure it is preferred that the density (g/cc) of the oxidized polyethylene be about 0.90 to 1.2, and preferably about 0.95 to 1.0, with the preferred density depending on the degree of crystallinity and carbonyl group concentration. Further, in view of the processability of the coated article or the strength of the coating per se, it is preferred that the average molecular weight of the oxidized polyethylene be about 1,000 to 50,000, and preferably about 4,000 to 10,000.

Any of the known base resins heretofore used to form anti-corrosive primer layers can be employed as the coating film-forming base resin in the present invention. In general, in order to achieve the aforementioned multi-layer distribution structure in the primer layer and increase the bondability of the primer layer to the metal substrate, it is preferred to use a coating film-forming base resin or polymer having a density greater by at least about 0.1 than the density of the modified olefin resin, generally a density of 1.2 to 1.3, and containing hydroxyl functional groups and/or carbonyl functional groups at a concentration of at least about 1 milliequivalent per gram of the polymer, and preferably 3 to 20 milliequivalents per gram of the polymer.

When a base resin having a density higher by at least 0.1 than the density of the modified olefin resin is used, it becomes much easier to obtain the specific multi-layer distribution structure of the present invention in the primer layer. Further, if the concentration of hydroxyl or carbonyl functional groups in the base resin or polymer is at least 1 milliequivalent per gram of the polymer, the adhesion of the primer layer to the metal substrate and the corrosion resistance of the latter can be further improved.

In the base resin used to form the primer layer, hydroxyl groups can be included in the main or side chain of the polymer in the form of alcoholic hydroxyl groups, phenolic hydroxyl groups or a mixture thereof, and carbonyl groups can be introduced into the main or side chain of the polymer in the form of a carboxylic acid, carboxylic acid salt, carboxylic acid ester, carboxylic acid amide, ketone, imide, urea or urethane.

Base resins meeting the foregoing requirements include thermosetting and thermoplastic resin vehicles customarily used in paint formulations. For example, one can use thermosetting resins such as phenol-formaldehyde resins, urea-formaldehyde resins, melamine-formaldehyde resins, xylene-formaldehyde resins, epoxy resins, alkyd resins, polyester resins, thermosetting acrylic resins, urethane resins and mixtures thereof, and thermoplastic resins such as acrylic resins, vinyl chloride-vinyl acetate copolymers, vinyl chloride-vinyl acetate-maleic acid copolymers, vinyl butyral resins, other vinyl resins, styrene-butadiene-acrylic acid ester copolymers, polyamide resins and petroleum resins, consistent with the foregoing requirements.

The so-called thermosetting resins are preferably employed as base resins for formulation of primers in the present invention, and among them, phenolic resin-epoxy resin paints, urea resin-epoxy resin paints, melamine resin-epoxy resin paints and phenolic resin-vinyl resin paints are especially preferred.

In forming a coating composition for preparing the primer layer, the modified olefin resin (A) is combined with the coating film-forming base resin (B) at an (A)/(B) weight ratio of from about 0.2/99.8 to 70/30. Since in the bonded region of the primer layer the base resin (B) is distributed predominantly in the portion contiguous to the metal substrate and the modified olefin resin (A) is distributed predominantly in the portion contiguous to the polyolefin layer, even if the content of the modified olefin resin is as low as 0.2% by weight, the bonding force between the primer layer and the polyolefin layer will be increased, and even if the content of the base resin is as low as 70% by weight, the adhesion between the primer layer and the metal substrate will be enhanced.

A masking layer containing a distribution controlling agent (C) for the modified olefin resin (A) is partially applied to the metal substrate, and when the primer having the above-mentioned composition is coated on the thus-treated metal substrate under specific conditions, the aforementioned multi-layer distribution structure is formed in the planar region other than the masking layer-applied region and formation of the multi-layer distribution structure is prevented in the masking layer-applied region.

Any material which prevents the modified olefin resin in the primer layer from being distributed predominantly in the surface portion of the primer layer can be used as the distribution controlling agent. In general, such materials exhibit a chemical or physical action with the modified olefin resin. Suitable distribution controlling agents include oleoresins and oil-modified resins containing as constituents oils such as drying oils, e.g., linseed oil, tung oil, perilla oil and dehydrated castor oil; semi-drying oils, e.g., camelia oil, olive oil, castor oil and coconut oil; and resins modified with these oils.

For example, oil-modified alkyd resins, oil-modified epoxy resins, oil-modified phenolic resins, oil-modified amino resins, oleoresinous paints, oil-modified polyamide resins, oil-modified acrylic resins and oil-modified vinyl resins can be used singly or in the form of mixtures of two or more of them. The degree of modification with an oil is not particularly critical, but it is generally preferred to use oil-modified resins containing 15 to 85% by weight of a drying oil, semi-drying oil or non-drying oil based on the total resin. Other suitable distribution controlling agents include resins containing a fatty acid or polymerized fatty acid as a constituent, such as polyamide resins comprising a copolymerized fatty acid as the acid component and resins modified with linolic acid, linoleic acid or dehydrated caster oil fatty acid; polyalkylene polyols such as polyethylene glycol, polypropylene glycol and ethylene oxide-polyhydric alcohol adducts, aliphatic amines and fatty acid amides; fatty acid metal soaps such as calcium stearate; organosiloxanes such as dimethylpolysiloxane;

and butadiene-type paints such as boiled modified polybutadiene glycol.

The distribution controlling agents suitable for use in the present invention are not limited to those mentioned above. For example, it has been confimed that when an epoxy type plasticizer such as epoxidized soybean oil, a phthalic acid ester type plasticizer such as DOP or a polyester type plasticizer is incorporated into the masking layer, as the distribution controlling agent, the desired prevention of the multi-layer distribution structure in the primer layer can be achieved. While not wishing to be bound by theory, it is believed that the plasticizer in the masking layer migrates into the primer layer and has the effect of distributing the modified olefin resin uniformly in the primer layer.

Accordingly, the distribution controlling agents used in the present invention can include not only substances preventing the multi-layer distribution of the modified olefin resin by chemical affinity or reactivity with the modified olefin resin or by electrostatic attractive force, but also substances which alter the dispersibility of the modified olefin resin in the base resin.

When the distribution controlling agent has coating forming properties, it can be applied to the metal substrate singly as the masking layer or it can be applied to the metal coating in combination with a coating-forming base resin. If the distribution controlling agent has no coating forming property, it can be applied to the metal substrate incorporated in a coating-forming base resin as the masking layer.

In order to attain the objects of the present invention advantageously, it is preferred that the amount coated of the distribution controlling agent be about 1 to 300 mg/dm$^2$, preferably about 2 to 150 mg/dm$^2$, although the preferred amount coated varies to some extent depending on the kind used. When the distribution controlling agent is applied in combination with a coating-forming base resin, the entire amount coated is desirably about 10 to 500 mg/dm$^2$, and preferably about 20 to 200 mg/dm$^2$.

The masking layer is ordinarily applied to the metal substrate in the form of a paint or ink in an appropriate organic solvent by means of a coater or printing machine. The masking layer can be applied to the metal substrate in a network or dot pattern, band-like, ring-like or radial shape, a pattern of concentric circles, a geometric pattern of circles, squares or triangles or a combination of such patterns or shapes.

While the masking layer is still in the as-coated or as-printed wet state or after it has been dried or baked, the subsequent primer coating paint is applied.

The amount of primer layer coated on the metal substrate, i.e., the weight of non-volatile resin solids per unit surface area of the metal substrate, is desirably about 10 to 500 mg/dm$^2$, and preferably about 30 to 100 mg/dm$^2$. If the amount of primer layer coated is within this range, a good combination of a high corrosion resistance and a high adhesion can be attained. The amount of modified olefin resin coated is desirably about 0.01 to 100 mg/dm$^2$, and preferably about 0.1 to 10 mg/dm$^2$, and the amount of base resin coated is desirably about 1 to 500 mg/dm$^2$, and preferably about 10 to 100 mg/dm$^2$.

In carrying out the primer layer coating step, a liquid coating composition comprising the modified olefin resin and base resin at the above-mentioned weight ratio in a mixed solvent described hereinafter is prepared and applied to the surface of the metal substrate in the masked and non-masked region, after which the mixed solvent is evaporated to obtain the above-mentioned novel multi-layer distribution structure in the primer layer in the non-masked region.

In order to effectively obtain the multi-layer distribution structure in the primer layer, it is important that the mixed solvent contain at least 70% by weight of a solvent component having a solubility parameter (Sp value) of about 8.0 to 9.5 and the difference between the atmospheric boiling point of the solvent component ($S_1$) having the highest boiling point and the boiling point of the solvent component ($S_2$) having the lowest boiling point should be at least about 20° C., preferably at least about 25° C.

When a solvent having a solubility parameter (Sp value) within the above range is used in an amount of at least about 70% by weight based on the total mixed solvent, the base resin can be completely dissolved in the mixed solvent and the modified olefin resin is dispersed or suspended in the form of fine particles having a so-called emulsion particle size of between about 2 and 50 microns, and preferably between about 5 to 20 microns. If the paint thus prepared is coated and baked or cured, the above-mentioned multi-layer distribution structure can be obtained in stable form. When a solvent having a solubility parameter (Sp value) in the above range is not contained in the mixed solvent or its content is lower than 70% by weight, it is generally difficult to form a paint having the above-mentioned dispersion state and which is capable of forming a multi-layer distribution structure.

When a single solvent is used or when the maximum difference in boiling points is less than 20° C. in the case where a plurality of solvents are used, it is difficult to form a primer layer having the abovementioned multi-layer distribution structure, and the processability of the primer-coated metal substrate or the polyolefin-metal bonded structure is unsatisfactory. In contrast, when the modified olefin resin (A) and the base resin (B) are dissolved in an appropriate mixed solvent and the resulting paint is coated on the substrate and cured, as will be apparent from examples hereinbelow, there is formed in the non-masked region of the primer layer a structure in which the modified olefin resin is distributed predominantly in the surface portion of the coating. The reason is not completely understood, but it is believed that under conditions of drying or baking the coated paint, the temperature of the coating composition varies with a certain gradient while the solvents are evaporated and this temperature variation promotes the formation of the desired multi-layer distribution structure.

The solvent ($S_1$) having the highest boiling point is used in an amount of between 10 and 70% by weight, and preferably between about 20 to 60%, based on the total solvents, and the solvent ($S_2$) having the lowest boiling point is used in an amount of between about 10 and 70% by weight, and preferably about 20 to 60%. Suitable solvents include ketones such as acetone, methylethyl ketone (MEK), methylisobutyl ketone (MIBK), cyclohexanone and isophorone; alcohols such as diacetone alcohol, n-butanol, methylcellosolve and butylcellosolve; and aromatic hydrocarbons such as toluene, xylene and decalin. Examples of suitable combinations of solvents are methylisobutyl ketone/methylethyl ketone, methylisobutyl ketone/diacetone alcohol/xylene, and n-butanol/xylene/cyclohexanone/isophorone.

A coating composition for forming the primer layer can be prepared by dissolving the base resin in one or more of the foregoing organic solvents and adding the modified olefin resin in the form of a solution in, for example, hot xylene or decalin to the base resin solution to form a homogenous composition. In general, the resin concentration in the thus-formed liquid coating composition is preferably between about 10 and 50% by weight.

Before applying a primer layer to the surface of the metal substrate, the latter can, if desired, be degreased and washed according to well-known procedures, whereupon the above-mentioned liquid coating composition is applied to the surface of the metal substrate by conventional coating means such as dip coating, spray coating, roller coater coating, bar coater coating, and electro-deposition coating.

The liquid coating composition applied to the metal substrate is then cured by drying or baking. In general, the baking step should be carried out at a temperature higher than the melting point of the modified olefin resin, preferably about 150° to 200° C. In this way, the base resin is distributed predominantly in the portion of the primer layer contiguous to the metal substrate in the non-masked region of the primer layer and the modified olefin resin is distributed in the surface portion of the primer layer in the non-masked region thereof, to form the multi-layer distribution structure. Although the reason for this phenomenon has not been completely elucidated, it is believed that in the combination of the modified olefin resin and base resin having the above-mentioned specific properties, under drying conditions a tendency to cause phase separation between the two resins is brought about and the modified olefin resin, having a lower specific gravity, is caused to rise in the surface portion of the primer coating, and this tendency to cause phase separation is promoted by evaporation of the solvents. In the case where the base resin is a thermosetting resin, curing of the base resin is caused by the heat treatment, and it is believed that formation of the multi-layer distribution structure is promoted also by curing of such resin.

Any heating device can be used for this heat treatment as long as the temperature used is within the above-mentioned range. For example, heating furnaces customarily used for the baking of coatings, such as a hot air furnace, infrared heating furnace, high frequency induction heating furnace and the like, can be used in the present invention.

The fact that the primer layer formed according to the present invention has the above-mentioned multi-layer distribution structure in the non-masked region, and the distribution ratio of the modified olefin resin in the surface portion of the primer later in the masked region is lower than the distribution ratio of the modified olefin resin in the surface portion of the primer layer in the non-masked region can be confirmed by dividing the primer layer into three sub-layers, namely, a topmost sub-layer ($L_S$) nearest to the polyolefin layer, an intermediate sub-layer ($L_M$) and a lowermost sub-layer ($L_B$), and determining the distribution ratios (contents, %) of the modified olefin resin in the respective sub-layers. More specifically, a heat-treated primer coating is caused to fall in contact with steel wool attached to a rotation shaft, thereby peeling off a layer having a predetermined thickness (about 1 micron) by abrasion. The iron component is removed from the powder of the peeled coating by using a magnet and the residual powder is subjected to infrared absorption analysis using the KBr pellet method. An absorption, e.g., the methylene stretching frequency (2920 cm$^{-1}$), which does not overlap the characteristic absorptions for the base resin, is chosen as the characteristic absorption for the modified olefin resin, and the concentration of the latter is determined from a calibration curve.

In the bonded structure of the present invention, the masked planar region of the primer layer is characterized in that the distribution ratio of the modified olefin resin in the topmost sub-layer ($L_S$) there is less than about 50%, and preferably less than about 40%.

The fact that the primer layer of the bonded structure of the present invention has the above-mentioned specific distribution structure can also be confirmed by observing the surface of the polyolefin layer after it has been peeled and separated from the metal substrate. In the tightly bonded first region, transfer of a relatively large amount of white fine particles of the modified olefin resin onto the polyolefin layer is observed (see element 7 in FIG. 1 of the accompanying drawings), whereas in the second region, namely the weakly bonded region, the polyolefin layer is relatively smooth, and there is little or no observed transfer thereto of modified olefin resin particles.

Polyolefins suitable for application to the primer layer include, for example, polyolefins such as low-, medium-, and high-density polyethylenes, isotactic polypropylene, ethylene/butene-1 copolymers, polybutene-1, ethylene/hexene copolymers, ethylene/propylene copolymers and ethylene/propylene/conjugated diene terpolymers, and olefin copolymers and modified polyolefins composed mainly of an olefin and containing a small amount of an ethylenically unsaturated monomer other than an olefin, e.g., ethylene/vinyl acetate (EVA) copolymers, saponified ethylene/vinyl acetate (EVAL) copolymers, ethylene/acrylic acid copolymers, ethylene/methyl methacrylate copolymers, polyethylenes modified with unsaturated carboxylic acids such as maleic acid, acrylic acid, methacrylic acid and esters thereof, polypropylenes modified with unsaturated carboxylic acids such as maleic acid, acrylic acid and esters thereof, ionomers and chlorosulfonated polyethylenes. These polyolefins can be used singly or in the form of mixtures of two or more of them. One or more elastomers such as ethylene/propylene rubber (EPR), ethylene/propylene/diene rubber (EPDM), polyisobutylene (PIB), butyl rubber (BR), natural rubber (NR), stereospecific polyisoprene, nitrile rubber (NBR), polybutadienne (PB), styrene/butadiene copolymers, styrene/isoprene copolymer and polychloroprene (CR) can be incorporated in amounts of between about 1 and 60% by weight into polyethylene, polypropylene or EVA resin, whereby elastic properties necessary for packings or sealants can be improved.

Various additives can be incorporated into the polyolefin according to procedures known in the art. For example, one can incorporate antioxidants or stabilizers of the phenol, organic sulfur, organic nitrogen, or organic phosphorus types; lubricants such as metal soaps or other fatty acid derivatives; fillers such as calcium carbonate, white carbon, titanium white, magnesium carbonate, magnesium silicate, carbon black and clays; and coloring agents.

A cross-linking agent, foaming agent or mixtures thereof can be incorporated into the polyolefin used in the present invention, and a cross-linked, foamed, or cross-linked and foamed polyolefin layer can be formed.

For example, when it is desired to form a coating of a polyolefin having optimum heat resistance, durability and mechanical properties such as elasticity on the metal substrate, it is recommended that a cross-linking agent be incorporated in the polyolefin. When it is desired to form a coating having optimum cushioning ability necessary for a packing or sealant, it is preferred to incorporate a foaming agent, optionally with a cross-linking agent, into the polyolefin. Examples of cross-linking agents decomposing at temperatures near the processing temperature (softening point) of the polyolefin used are organic peroxides such as dicumyl peroxide, di-t-butyl peroxide, cumyl hydroperoxide and 2,5-dimethyl-2,5-di(tert-butylperoxy) hexene-3; and foaming agents decomposing at temperatures near the processing temperature include 2,2-azobisisobutyronitrile, azodicarbonamides and 4,4-hydroxybenzenesulfonylhydrazide. Cross-linking agents can be used in amounts of between about 0.1 and 5% by weight based on the weight of the polyolefin and foaming agents can be used in amounts of between about 0.2 and 10% by weight.

The polyolefin layer is heat-bonded to the metal substrate through the aforementioned primer layer at a temperature at least about 10° C. greater than the higher of the melting point of the modified olefin resin and the melting point of the polyolefin, generally at about 120° to 300° C., and preferably at about 150° to 230° C. The polyolefin is applied in the form of a film, sheet, powder or other molded article to the primer layer formed on the metal substrate, and the polyolefin is heated at the above-mentioned temperature to fusion-bond the polyolefin to the primer. The assembly is then cooled to obtain a bonded structure. Heating of the polyolefin can be accomplished by various means, for example, (a) passing the assembly through a heated furnace, (b) heating the assembly by the heat transferred from a heated press or roll, (c) heating the metal substrate in advance or in situ by high frequency induction heating or the like and fusion-bonding the polyolefin to the metal substrate, and (d) heating the assembly by infrared rays, ultrasonic vibration, plasma or laser.

Another method for bonding the polyolefin layer to the metal substrate through the primer layer according to the present invention comprises extruding a polyolefin melt at the above-mentioned temperature onto the primer layer formed on the metal substrate to fusion-bond the polyolefin to the metal substrate through the primer layer. In this method, the molten polyolefin can be applied in the form of a continuous molded article such as a tape, film, sheet, tube or sheath onto the metal substrate using extrusion coating techniques. Another suitable method involves extruding the polyolefin in molten form onto the primer layer and then fusion-bonding it to the metal substrate while the molten polyolefin is cooled and molded into a desirable shape by a roll, press or stamper. The former extrusion coating method is advantageous when a continuous coating of the polyolefin onto the metal substrate is desired, and the latter method is advantageous when a layer of the polyolefin is to be formed on a specific portion of the metal substrate. Fusion bonding of the polyolefin to the metal substrate can be completed in a very short time, e.g., on the order of a microsecond or millisecond, if desired.

When the polyolefin applied to the metal substrate is to be cross-linked, foamed, or cross-linked and foamed, after fusion-bonding of the polyolefin to the primer layer on the metal substrate the polyolefin layer is heated at a temperature higher than the decomposition temperature of the foaming agent or cross-linking agent, as the case may be.

When the metal substrate is a thin structure such as a foil, sheet, tube or vessel, the polyolefin layer can be applied to either one surface of the metal substrate or both surfaces of the substrate. Further, a sandwich-bonded structure can be formed by fusion-bonding both surfaces of the polyolefin layer to metal substrates such as foils or sheets.

By heat-bonding the polyolefin layer to the metal substrate through the primer later having the above-mentioned specific multi-layer distribution structure, there are formed a highly bonded region and a weakly bonded or non-bonded region between the polyolefin layer and the metal substrate. In a structure formed by fusion-bonding the polyolefin layer to the metal substrate directly, without an intermediate primer layer, corrosion of the metal substrate readily occurs at the interface between the metal substrate and polyolefin layer, and severe corrosion of the metal substrate advances from the uncoated portion or edge portion in this bonded structure unless the entire surface of the metal substrate is covered with the polyolefin; and such corrosion accelerates premature peeling of the polyolefin layer from the metal substrate. This drawback is effectively eliminated by the present invention through prior formation of the above-mentioned primer layer on the metal substrate.

As will be apparent from the foregoing, the present invention is highly useful for producing crown closures, bottle caps, can lids and other vessel closures including "easy open" vessel closures, which have a packing or sealant derived from a polyolefin. Further, by virtue of the aforementioned desirable combination of high peel resistance and high corrosion resistance, the bonded structure of the present invention is eminently useful for producing various lined vessels such as cans, tanks, chemical reaction vessels and flexible packages, construction materials and vehicle construction materials such as wall plates and roofing materials, and various ordinary utensils such as laminated tables, decorating materials, insulating materials, coated wires, coated cables and the like.

DESCRIPTION OF THE PREFERRED EMBODIMENTS

Figure 1:
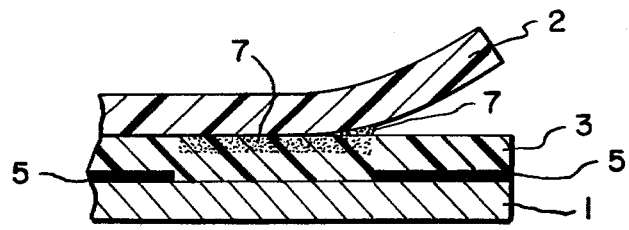
FIG. 1 is a sectional view illustrating diagrammatically one embodiment of the bonded structure of the present invention.
Figure 2:
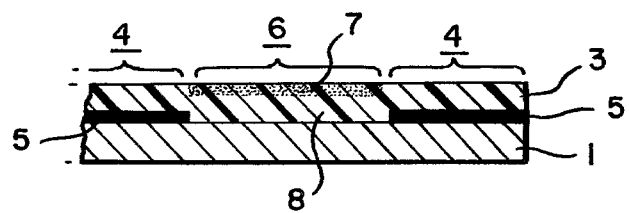
FIG. 2 is a sectional view illustrating a primer-layer coated substrate before bonding a polyolefin layer thereto.

Referring to FIGS. 1 and 2 illustrating respectively vertical sections of the bonded structure of the present invention and the primer-layer coated structure before bonding a polyolefin layer thereto, metal substrate 1 and polyolefin layer 2 are bonded together through primer layer 3. Masking layer 5 containing a distribution controlling agent for a modified olefin resin is formed in a predetermined planar region 4 and in the remaining planar region 6, the masking layer is not applied. Primer layer 3 containing a modified olefin resin and a coating film-forming base resin is applied to substrate 1 and over masking layer 5. In planar region 6, a multi-layer distribution structure is formed in the primer layer having resin component concentration gradients in the thickness direction such that the modified olefin resin is distributed predominantly in top face portion 7 (which includes the aforementioned top-most sub-layer $L_S$) of primer layer 3 and the base resin is distributed predominantly in the lower portion 8 (which includes the aforementioned lowermost sub-layer $L_B$) of the primer layer contiguous to the metal substrate 1. In the masking layer-applied planar region 4, the modified olefin resin is distributed uniformly with respect to the thickness direction of primer layer 3 because of the mutual interaction of the modified olefin resin with the distribution controlling agent in the masking layer 5 and in this region, the distribution ratio of the modified olefin resin in the top surface portion of primer layer 3 is lower than the distribution ratio of the modified resin in the top surface portion of the primer layer in planar region 6. When polyolefin layer 2 is heat-bonded to metal substrate 1 through primer layer 3 having the aforementioned specific distribution structure, the polyolefin layer is tightly bonded to the primer layer over region 6 where the modified olefin resin is distributed in the top surface portion, but in region 4 where the modified olefin resin is distributed in the surface portion of the primer layer at a lower distribution ratio, a weaker bond is formed according to the distribution ratio of the modified olefin resin or no substantial bonding is formed. In this bonded structure, when polyolefin layer 2 is peeled from the metal substrate 1, since in the peeling-initiating region 4 where a weak bond is formed or a non-bonding state is manifested, the peeling operation can be performed smoothly and with ease. Further, when regions of weak or no substantial bonding and regions of tight bonding are appropriately arranged, an easily peelable strength of 0.02 to 5 kg/cm can be attained between polyolefin layer 2 and the metal substrate 1.

Figure 3:
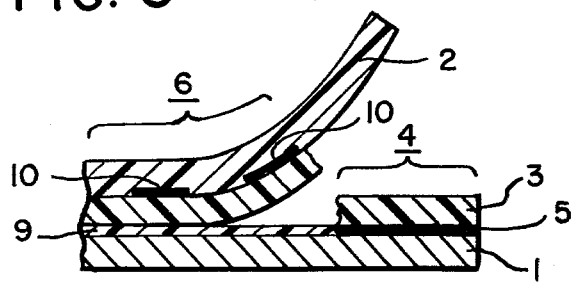
FIG. 3 is a sectional view illustrating another embodiment of the bonded structure of the present invention.

The bonded structure of the present invention can be used to make crown or cap closures in which an ink layer is transferred to a packing layer from the inner face of a crown or cap shell when the former is peeled from the crown or cap shell. Referring to FIG. 3 which illustrates this embodiment, reference numeral 9 represents a layer of a known paint having no adhesiveness to primer layer 3 and reference numeral 10 represents a printing ink layer displaying a hit mark or the like. Peeling of olefin resin layer 2 is initiated from the edge portion of the weakly bonded or non-bonded region 4, and when peeling is advanced to the end of region 6 where the modified olefin resin is distributed predominantly in the surface portion of primer layer 3, breakage of the primer layer occurs and peeling is further advanced in the interface between the primer layer and paint layer 9.

The following examples are presented for the purpose of illustrating without limitation the features of the present invention and the advantages thereof. In the examples, parts and percentages are by weight unless otherwise indicated.

EXAMPLE 1

A mixture of 1.0 mole of p-cresol, 1.2 moles of formaldehyde and 0.2 mole of ammonia is heated on a water bath to form an ammonia-cresol base resin. A quantity (40 parts) of this resin and 60 parts of a bisphenol-A type epoxy resin (Epikote ® 1007 manufactured by Shell Chemical Company) are dissolved in a mixed organic solvent made up of equal amounts of methylisobutyl ketone and methylethyl ketone to form a base resin solution. Next, a maleic anhydride-modified olefin resin having 74.9% crystallinity and a degree of modification of 30.5 mg/100 g is dissolved in hot xylene to form a 10% solution. This solution is added to the base resin solution with sufficient agitation so that the amount of modified olefin resin added to the base resin is 20% (solids) based on the base resin. In this way, a primer coating composition or paint having a total solids content of about 30% is obtained.

A resin solution (distribution controlling agent) shown in Table 1 is spot-coated on a surface-treated steel plate (Hi-Top ® manufactured by Toyo Kohan) as a masking layer by using a grooved roll coater designed so that coatings having a width of 20 mm are formed at 50 mm intervals. The amount coated of the distribution controlling agent is 50 mg/dm$^2$ (dry weight). The coated steel plate is then heated at 190° C. for 10 minutes. Next, the above-mentioned primer paint is coated on the spot-coated surface so that the thickness of the resulting primer layer after curing and drying is 6 microns, and heating is carried out at 190° C. for 10 minutes resulting in a coated steel plate having a partially applied masking layer.

A laminate comprising a film of low density polyethylene (having a melt index of 7.0 and a density of 0.92) having a thickness of 100 microns and a film of polyester (Dia Foil Film ®) having a thickness of 12 microns is heat-bonded under pressure to the coated steel plate at 160° C. for 5 seconds so that the polyethylene film faces the coated plate, thereby forming a laminated film-coated plate bonded structure. The peel strength between the laminated film and the coated plate is measured at a pulling speed of 50 mm/min by a tensile tester on a sample 20 mm wide, 100 mm long and including a distribution controlling agent-applied region and the a distribution controlling agent-free region. The results obtained are shown in Table 1.

The primer layer is divided into three thin sub-layers each having a thickness of about 2 microns (topmost sub-layer $L_S$, intermediate sub-layer $L_M$ and lowermost sub-layer $L_B$) according to the aforementioned surface polishing method. The amount of modified polyethylene in each sub-layer is determined by infrared absorption and the distribution ratio (%) is calculated therefrom. The results obtained are shown in Table 1.

The results reported in Table 1 establish that when an oil-free alkyd resin, an acrylic-modified alkyd resin or a styrene-modified alkyd resin is sought to be used as the distribution controlling agent, the modified olefin resin (polyethylene) is distributed at a higher distribution ratio in the surface portion of the primer layer both in the controlling agent-applied region and the controlling agent-free region. Accordingly, there is no substantial difference in the peel strengths between the controlling agent-applied region and the controlling agent-free region, and therefore these resins are not effective in the present invention. With other resins, on the other hand, there is a big difference in the amount of modified polyethylene distributed in the surface portion of the primer layer between the controlling agent-applied region and the controlling agent-free region, and one can therefore obtain bonded structures in which there is a difference in peel strengths between the controlling agent-applied region and the controlling agent-free region. These resins are therefore effective for use in attaining the objects of the present invention.

In either the distribution controlling agent-applied region or the distribution controlling agent-free region, peeling is caused at the interface between the primer layer and polyethylene film of the laminate. It is found that each of the foregoing distribution controlling agents is characterized in that the distribution of the modified polyolefin can be controlled in a very short time at the step of baking the primer paint.

mixed solvent made up of equal amounts of xylene and methylethyl ketone) is roll-coated as a rust-preventing undercoat on the entire surface of a degreased, chemically treated steel plate (having a thickness of 0.25 mm) so that the amount coated is 50 mg/dm$^2$ in the dry state, and the coated plate is heated at 200° C. for 10 minutes.

A distribution controlling agent shown in Table 2 is added in an amount of 5% as solids to an epoxy- Table 1

| Run No. | Distribution Controlling Agent | Distribution Ratio (%) of Modified Olefin Resin in Topmost Sublayer of Primer | | Peel Strength (Kg/20 mm) | | Peeled Interface | Trademark (Oil Length) |
|---|---|---|---|---|---|---|---|
| | | Controlling Agent-Applied Region | Controlling Agent-Free Region | Controlling Agent-Applied Region | Controlling Agent-Free Region | | |
| 1 | soybean oil-modif'd alkyd | 39.2 | 86.6 | 0.45 | 5.0 | Laminate film/primer | Phthalkyd 235-50 (35%) |
| 2 | soybean oil-modif'd alkyd | 34.8 | 86.6 | 0.21 | 5.0 | " | Phthalkyd 261-60 (61%) |
| 3 | linseed oil-modif'd alkyd | 40.1 | 86.6 | 0.50 | 4.9 | " | Beckosol 1313 (41%) |
| 4 | linseed oil-modif'd alkyd | 27.2 | 86.6 | 0.14 | 5.0 | " | Phthalkyd 375-100 (75%) |
| 5 | castor oil-modif'd alkyd | 40.2 | 86.6 | 0.50 | 4.9 | " | Phthalkyd 444-50 (44%) |
| 6 | castor oil-modif'd alkyd | 40.7 | 86.6 | 0.52 | 4.9 | " | Beckosol 1308 (44%) |
| 7 | coconut oil-modif'd alkyd | 40.9 | 86.6 | 0.53 | 5.0 | " | Phthalkyd 133-60 (33%) |
| 8 | coconut oil-modif'd alkyd | 39.0 | 86.6 | 0.45 | 5.0 | " | Beckosol 1323 (32%) |
| 9 | linseed oil modif'd epoxy | 49.2 | 86.6 | 1.32 | 4.9 | Laminate film/primer | Beckosol P-789 (57%) |
| 10 | phenol - modif'd alkyd | 42.9 | 86.6 | 0.89 | 5.0 | " | Beckosol 1341 (linseed oil) (285) |
| 11 | acrylic - modif'd alkyd | 76.5 | 86.6 | 4.50 | 5.0 | " | Phthalkyd V901 (—) |
| 12 | styrene-modif'd alkyd | 70.8 | 86.6 | 4.21 | 4.9 | " | Styresol 4440 (—) |
| 13 | oil-free alkyd | 78.9 | 86.6 | 4.72 | 5.0 | " | Beckolite M-6003-60 (—) |
| 14 | polyamide | 39.0 | 86.6 | 0.45 | 5.0 | " | Hitamide 411 (—) |
| 15 | polybutadiene | 37.5 | 86.6 | 0.25 | 4.9 | " | NISSO-PB GQ-1200 |

In this example, a masking layer is formed by heating and drying the distribution controlling agent. By experiments conducted separately, it is found that such agents can exert a distribution controlling effect even if they are not heated or dried and that indeed, a higher effect is obtained if they are not so treated. Particularly in the case of oil-modified alkyd resins, a non-bonded state can be obtained in the masked region even if no heating is used.

It is readily seen from the foregoing that one aspect of the present invention resides in a process wherein a bonded structure having different peel strengths at the same peel interface can be obtained in a short time by a reduced number of steps, namely, by coating the distribution controlling agent in the appropriate form (for example, as an ink or gel) by means of an appropriate coating device (for example, a spot coater or printing machine), coating a primer paint on the distribution controlling agent without drying it and conducting the baking operation at least once.

EXAMPLE 2

An epoxy-amino paint (a 30% solution of 75 parts of Epikote ® 1007 and 35 parts of Beckamine P-138 in a mixed solvent made up of equal amounts of xylene and methylethyl ketone) is roll-coated as a rust-preventing undercoat on the entire surface of a degreased, chemically treated steel plate (having a thickness of 0.25 mm) so that the amount coated is 50 mg/dm$^2$ in the dry state, and the coated plate is heated at 200° C. for 10 minutes.

phenolic resin solution (comprising 80 parts of Epikote ® 1009 and 20 parts of Hitanol ® 4020 in a mixed solvent made up of equal amounts of xylene and butylcellosolve). The resulting paint is spot-coated onto the rust-preventing undercoat in an amount coated of 50 mg/dm$^2$ in the dry state by means of the same grooved roll coat used in Example 1 and the coated plate is heated at 185° C. for 10 minutes.

In the same manner as in Example 1, the maleic acid-modified polyethylene is added in an amount of 10% as solids in a phenol-modified vinyl resin comprising 70 parts of a vinyl chloride/vinyl acetate copolymer (VMCH ® maufactured by Union Carbide Corporation) and 30 parts of a phenolic resin (Hitanol 2080) in the form of a 25% solution in a mixed solvent made up of equal amounts of methylisobutyl ketone and xylene, to form a primer paint.

The primer paint is applied to the entire surface of the spot-coated steel plate so that the thickness after curing and drying is 6 microns, and the coated plate is heated at 190° C. for 10 minutes to provide a coated plate having a partially applied masking layer.

In the same manner as in Example 1, a laminate film is heat-bonded under pressure to the coated plate to form a bonded structure having a partial laminated film/primer layer/masking layer/undercoat/metal structure, and the peel strength between the laminated film and the coated plate is measured under the same conditions as in Example 1 to obtain results shown in Table 2. All of the distribution controlling agents except kerosine are found to have a distribution controlling effect, resulting in bonded structures having two different peel strengths at the same interface as a result of the fact that the amount of modified polyethylene distributed in the surface portion of the primer layer is large in the masking-free region but small in the masking-applied region.

Table 2

| Run No. | Distribution Controlling agent | Peel Strength (Kg/20 mm) Controlling Agent - Applied Region | Peel Strength (Kg/20 mm) Controlling Agent - Free Region | Peeled Interface | Remarks |
|---|---|---|---|---|---|
| 1 | soybean oil | 1.0 | 3.5 | Laminate film/primer layer | |
| 2 | linseed oil | 1.2 | 3.3 | " | |
| 3 | castor oil | 1.3 | 3.4 | " | |
| 4 | silicone oil | 0.6 | 3.4 | " | Shinetsu Silicone KF-96 |
| 5 | vaseline | 2.1 | 3.5 | " | |
| 6 | beef tallow | 1.7 | 3.5 | " | |
| 7 | manganese naphthenate | 1.3 | 3.3 | " | |
| 8 | calcium stearate | 0.9 | 3.4 | " | product of Sakai Kagaku |
| 9 | fatty acid amide | 1.9 | 3.4 | " | |
| 10 | dioctyl phthalate | 1.7 | 3.5 | " | Newtron S SCH-806 manufactured by Nippon Seika |
| 11 | epoxidized soybean oil | 1.2 | 3.3 | " | |
| 12 | dioctyl adipate | 1.7 | 3.3 | Laminate film/primer layer | |
| 13 | polyadipate | 1.5 | 3.4 | " | manufactured by Nippon Reichhold-P-204N |
| 14 | acetyl tributyl-citrate | 1.7 | 3.5 | " | |
| 15 | monoglyceride | 1.6 | 3.5 | " | P-204N - manufactured by Riken Vitamein |
| 16 | isicyanate | 2.0 | 3.4 | " | Colonate L - manufactured by Nippon Polyurethane |
| 17 | polyamide | 2.2 | 3.3 | " | Genamid 2000 - manufactured by Daiichi General |
| 18 | polyethylene glycol | 1.7 | 3.4 | " | |
| 19 | sorbitan ester | 1.8 | 3.4 | " | Elast TS-3 manufactured by Kao Soap |
| 20 | acrylic ester | 2.1 | 3.5 | Laminate film/primer layer | Aronix M5700 - manufactured by Toa Gosei |
| 21 | acrylic ester | 1.6 | 3.4 | " | Aronix E-1003 manufactured by Toa Gosei |

In either the masking-applied region or the masking-free region, peeling occurs in the interface between the primer layer and the polyethylene film of the laminate.

EXAMPLE 3

A vinyl chloride-vinyl acetate copolymer (VMCH ®) manufactured by Union Carbide Corporation) dissolved in a mixed solvent made up of equal portions of methylcellosolve and methylethyl ketone at a concentration of 15%, and oxidized polyethylene (having a density of 0.98, a softening point of 132° C. and a total oxygen concentration of 4.2%) is added in the form of a xylene solution to the vinyl resin solution in an amount of 20% based on the total resins to form a primer paint.

The same epoxy-amino paint as used in Example 2 is roll-coated as a rust preventing undercoat on the total surface of a degreased, electrically plated tinplate (having a thickness of 0.25 mm) in an amount coated of 50 mg/dm$^2$ in the dry state and heating is conducted at 200° C. for 10 minutes. Then a distribution controlling agent indicated in Table 3 is spot-coated as a masking layer on the rust preventing undercoating in an amount coated of 50 mg/dm$^2$ in the dry state by using the same grooved roll coater as in Example 1 and the coating is heated at 190° C. for 10 minutes.

The primer paint is coated on the total surface of the controlling agent spot-coated plate so that the thickness after curing and drying is 6 microns, and the coating is heated at 180° C. for 10 minutes to form a coated plate having a partial masking layer.

In the same manner as in Example 1, a laminated film is heat-bonded under pressure to the coated plate to form a bonded structure having a partial laminate filmed/primer layer/masking layer/undercoat/metal structure. The peel strength between the laminated film and the coated plate is measured by a tensile tester under the same conditions as in Example 1 to obtain the results shown in Table 3.

All of the distribution controlling agents except the acryl-modified alkyd resin and oil-free alkyd resin have a distribution controlling effect, resulting in bonded structures having two different peel strengths at the same peel interface as a result of the difference in the amounts of modified polyethylene distributed in the surface portion of the primer layer between the masking-applied region and the masking-free region.

In each bonded structure, peeling is caused at the interface between the primer layer and the polyethylene film of the laminated film in either the masking-applied region or the masking-free region.

EXAMPLE 4

Hit marks are printed on one surface of a chemically treated steel plate having a thickness of 0.27 mm, and, after drying, the distribution controlling agent is coated on the mark-printed surface as a masking layer to a thickness of 4 microns in a pattern of concentric circles. In particular, the distribution controlling agent is coated on the entire surface in a region interposed between an outer circle having a diameter of 26 mm and an inner circle having a diameter of 20 mm, and in the central portion within the inner circle, the distribution controlling agent is coated in dots.

having a diameter of 5 mm, and about 300 mg of the melt is cut off into the crown shell by a cutting blade and immediately punched by a cooled punch to form a crown closure having a polyethylene liner. When the liner is peeled off in each of the thus-prepared crown shells, peeling is accomplished very easily because the peripheral portion of the liner is hardly bonded. Further, since the central portion of the liner is dot-bonded, the liner as a whole can easily be taken out, and the hit marks below the opaque liner can be read. In each crown closure, peeling takes place at the interface between the polyethylene liner and the primer layer.

Bottles filled with a carbonated beverage at a pressure of 3 kg/cm$^2$ at 20° C. are sealed with the above crown closures. The bottles are stored at 50° C. and 100% relative humidity for 3 months. Problems such as leakage of gas (reduction of the inner pressure) and rusting do not occur, thereby confirming the high practical utility of the closures of the present invention.

The distribution ratio and the quantity of modified polyethylene particles transferred to the peeled face of the polyethylene liner confirm that the amount of modified polyethylene distributed in the surface portion of the primer layer in the region where the masking layer is applied is very small but very large in the masking- Table 3

| | | Peel Strength (Kg/20 mm) | | | |
|---|---|---|---|---|---|
| Run No. | Distribution Controlling Agent | Controlling Agent - Applied Region | Controlling Agent - Free Region | Peeled Interface | Trademark (Oil Length) |
| 1 | soybean oil-modified alkyd | 0.38 | 4.1 | laminate film/primer layer | Phthalkyd 235-50 (35%) |
| 2 | castor oil - modified alkyd | 0.40 | 4.1 | laminate film/primer layer | Phthalkyd 444-50 (44%) |
| 3 | coconut oil - modified alkyd | 0.35 | 4.0 | laminate film/primer layer | Beckosol 1323 (32%) |
| 4 | acryl - modified alkyd | 3.75 | 4.0 | laminate film/primer layer | Phthalkyd V-901 (—) |
| 5 | oil-free alkyd | 3.81 | 4.1 | laminate film/primer layer | Beckolite M-6003-60 (—) |
| 6 | polyamide | 0.39 | 3.9 | laminate film/primer layer | Hitamide 411 (—) |
| 7 | polybutadiene | 0.21 | 4.0 | laminated film/primer layer | NISSO-PB GQ-1200 |

These dots are uniformly distributed and the distance between the centers of two adjacent dots is 1 mm; and the area ratio of the coated portion to the uncoated portion is 60/40.

The same modified polyethylene-containing primer paint as used in Example 1 is roll-coated on the hit marks and masking layer in an amount coated of 50 mg/dm$^2$ in the dry state and the coating is heated at 250° C. for 2 minutes, 4 minutes, 7 minutes or 10 minutes. Thus, 4 kinds of coated plates are prepared.

On the uncoated side of each plate, an epoxy-amino paint layer, a printing layer and an overcoat layer (epoxy-ester paint) are formed in succession. Each of the thus prepared dual surface-coated plates is formed into a crown shell (having an inner diameter of 26 mm) by a crown forming press so that the hit marks are located inside and the peripheral edge of the masking layer portion is in alignment with the peripheral edge of the top face of the crown shell. Low density polyethylene (having a melt index of 7 and a density of 0.92) colored with titanium oxide and carbon black to such an extent that the hit marks on the inner face of the crown shell cannot be seen through the resulting polyethylene liner, is extruded in the molten state from an extruder having a diameter of 40 mm and provided with a nozzle free area, even though the masking-applied area is very close to the masking-free area.

The disclosure herein establishes the advantages of the present invention in preparing bonded structures having at least two portions differing in peel strength, and that bonded structures having different peel strengths in two or more regions of one laminar interface can be prepared in a short time. It will be understood, of course, that change and variations can be made in the foregoing without departing from the scope of the present invention which is defined in the following claims.

We claim:

1. A peelable polyolefin-metal bonded structure comprising:
    a metal substrate;
    a polyolefin layer;
    a primer layer disposed between and binding the metal substrate and polyolefin layer, said primer layer comprising:
    (a) an olefin resin (A) chemically modified with carbonyl groups at a concentration of between about 0.01 and 200 milliequivalents per 100 g of the modified olefin resin; and (b) a coating film-forming base resin (B) at an (A)/(B) weight ratio of between about 0.2/99.8 and 70/30, the primer layer having in at least one first planar region a multi-layer distribution structure with resin concentration gradients in the thickness direction such that the carbonyl group-modified olefin resin is distributed predominantly in the portion of the primer layer contiguous to the polyolefin layer and the base resin is distributed predominantly in the portion of the primary layer contiguous to the metal substrate, and in at least one second planar region a multi-layer distribution structure wherein the modified olefin resin is distributed in the portion of the primer layer contiguous to the polyolefin layer at a distribution ratio lower than the distribution ratio of the modified olefin resin in the portion of the primer layer contiguous to the polyolefin layer in the first planar region; and a masking layer containing a distribution controlling agent for the carbonyl group-modified olefin resin, said masking layer being disposed between the primer layer and metal substrate and corresponding to and defining said second planar region.

2. A bonded structure according to claim 1 wherein wherein the distribution controlling agent is an epoxy type plasticizer, a phthalic acid ester type plasticizer or a polyester type plasticizer.

3. A bonded structure according to claim 1 wherein the modified olefin resin is an olefin resin grafted with an ethylenically unsaturated carboxylic acid or ethylenically unsaturated carboxylic anhydride.

4. A bonded structure according to claim 1 wherein the modified olefin resin is an oxidized polyethylene.

5. A bonded structure according to claim 1 wherein the base resin has a density greater by about 0.1 than the density of the carbonyl group-modified olefin resin and contains functional groups selected from hydroxyl functional groups and carbonyl functional groups at a concentration of at least about 1 milliequivalent per gram of the base resin.

6. A bonded structure according to claim 1 wherein the base resin is selected from the group consisting of phenolic resin-epoxy resin paints, urea resin-epoxy resin paints, melamine resin-epoxy resin paints and phenolic resin-epoxy resin-vinyl resin paints.

7. A bonded structure according to claim 1 wherein the modified olefin resin is applied to the metal substrate in an amount of between about 0.1 and 10 mg/dm$^2$ and the base resin is applied to the metal substrate in an amount coated of between about 10 and 100 mg/dm$^2$.

8. A bonded structure according to claim 1 wherein the distribution controlling agent is applied in an amount coated of between about 1 and 300 mg/dm$^2$.

9. A bonded structure according to claim 1 wherein said structure is a vessel closure.

10. A bonded structure according to claim 1 wherein the metal substrate is a crown shell or cap shell, the polyolefin layer is a packing material and the entire structure is a vessel closure.

11. A bonded structure according to claim 1 wherein the primer layer is divided into three sub-layers, the distribution ratio, Dx, defined by the following formula:

$$D_x = 10000 W_x/(W)(C_A)$$

wherein W is the weight of the primer layer per unit surface area (mg/dm$^2$), $C_A$ is the average % by weight of the modified olefin resin in the primer layer, and $W_{X2}$ is the weight per unit area (mg/dm$^2$) of the modified olefin resin in each sub-layer, in the first planar region being at least about 50% in the sub-layer, $L_S$, contiguous to the polyolefin layer and not higher than about 10% in the sub-layer, $L_B$, contiguous to the metal substrate, and in the second planar region being not higher than 50% in sub-layer $L_S$.

12. A bonded structure according to claim 11 wherein the distribution ratio is at least about 70% in the sub-layer, $L_S$, in the first planar region and the distribution ratio is not higher than about 40% in the sub-layer, $L_S$, in the second planar region.

13. A bonded structure according to claim 3 wherein the distribution controlling agent is an oleoresin, an oil-modified resin, a resin comprising a fatty acid or polymerized fatty acid as a constituent, a polyalkylene polyol, a fatty acid metal soap, an organopolysiloxane or a polybutadiene.

14. A bonded structure according to claim 13 wherein the distribution controlling agent is an oleoresin or oil-modified resin containing between about 15 and 85% by weight of a drying oil, a semi-drying oil or a non-drying oil.

15. A bonded structure according to claim 1 wherein the modified olefin resin is an olefin resin modified with a carbonyl group-containing ethylenically unsaturated monomer, and has a degree of crystallinity of at least about 50%.

16. A bonded structure according to claim 15 wherein the modified olefin resin contains carbonyl groups at a concentration of between about 0.1 and 70 milliequivalents per 100 g of the olefin resin.

17. A process for preparing peelable polyolefin-metal bonded structures comprising a metal substrate and a polyolefin layer bonded to the metal substrate through a primer paint coating layer, said process comprising:

(a) applying a masking layer containing a distribution controlling agent for an olefin resin chemically modified with carbonyl groups onto at least one predetermined planar region on the surface of the metal substrate;

(b) applying to the masking layer-treated surface of the metal substrate a primer paint comprising the carbonyl group-modified olefin resin (A) containing carbonyl groups at a concentration of between about 0.01 and 200 milliequivalents per 100 g of the modified olefin resin and a coating film forming base resin (B) at an (A)/(B) weight ratio of between about 0.2/99.8 and 70/30 in a mixed solvent containing at least about 70% by weight of a solvent component having a solubility parameter of between about 8.0 and 9.5, said solvent being further characterized in that the difference between the boiling points of the highest and lowest boiling solvent components is at least about 20° C.; and (c) curing the applied primer paint whereby the carbonyl group-modified olefin resin (A) is distributed predominantly in the surface portion of the primer layer in the planar region other than the masking layer-applied region and the modified olefin resin (A) is distributed in the surface portion of the primer layer in the masking layer-applied planar region at a distribution ratio lower than the distribution ratio of the modified olefin resin (A) in the surface portion of the primer layer in the planar region other than the masking layer-applied region.

18. A process according to claim 17 wherein the modified olefin resin is an olefin resin grafted with an ethylenically unsaturated carboxylic acid or ethylenically unsaturated carboxylic anhydride.

19. A process according to claim 17 wherein the modified olefin resin is an oxidized polyethylene.

20. A process according to claim 17 wherein the base resin has a density greater by about 0.1 than the density of the modified olefin resin and contains functional groups selected from hydroxyl functional groups and carbonyl functional groups at a concentration of at least about 1 milliequivalent per gram of the base resin.

21. A process according to claim 17 wherein the base resin is selected from the group consisting of phenolic resin-epoxy resin paints, urea resin-epoxy resin paints, melamine resin-epoxy resin paints and phenolic resin-epoxy resin-vinyl resin paints.

22. A process according to claim 17 wherein the modified olefin resin is applied to the metal substrate in an amount of between about 0.1 and 10 mg/dm² and the base resin is applied to the metal substrate in an amount coated of between about 10 and 100 mg/dm².

23. A process according to claim 17 wherein the primer layer is divided into three sub-layers with respect to the thickness direction, the distribution ratio, $D_x$, defined by the following formula:

$$D_x = 10000 W_X/(W)(C_A)$$

wherein W is the weight of the primer layer per unit surface area (mg/dm²), $C_A$ is the average % by weight of the modified olefin resin in the primer layer, and $W_{X2}$ is the weight per unit area (mg/dm²) of the modified olefin resin in each sub-layer,
in the non-masking layer applied planar region being at least about 50% in the sub-layer, $L_S$, contiguous to the polyolefin layer and not higher than about 10% in the sub-layer, $L_B$, contiguous to the metal substrate, and in the masking layer-applied planar region being not higher than about 50% in sub-layer $L_S$.

24. A process according to claim 23 wherein the distribution ratio is at least about 70% in the sub-layer, $L_S$, in the non-masking layer applied planar region and the distribution ratio is not higher than about 40% in the sub-layer, $L_S$, in the masking layer-applied planar region.

25. A process according to claim 17 wherein the distribution controlling agent is an oleoresin, an oil-modified resin, a resin comprising a fatty acid or polymerized fatty acid as a constituent, a polyalkylene polyol, a fatty acid metal soap, an organopolysiloxane or a polybutadiene.

26. A process according to claim 25 wherein the distribution controlling agent is an oleoresin or oil-modified resin containing between about 15 and 85% by weight of a drying oil, a semi-drying oil or a non-drying oil.

27. A process according to claim 26 wherein the distribution controlling agent is an epoxy type plasticizer, a phthalic acid ester type plasticizer or a polyester type plasticizer.

28. A process according to claim 26 wherein the distribution controlling agent is applied in an amount coated of between about 1 and 300 mg/dm².

29. A process according to claim 17 wherein the carbonyl-group modified olefin resin is an olefin resin modified with a carbonyl group-containing ethylenically unsaturated monomer, and has a degree of crystallinity of at least about 50%.

30. A process according to claim 29 wherein the modified olefin resin contains carbonyl groups at a concentration of between about 0.1 and 70 milliequivalents per 100 g of the olefin resin.

* * * * *

UNITED STATES PATENT AND TRADEMARK OFFICE
CERTIFICATE OF CORRECTION

PATENT NO. : 4,224,379

DATED : September 23, 1980

INVENTOR(S) : ISAO ICHINOSE, FUMIO MORI & GO KUNIMOTO

It is certified that error appears in the above—identified patent and that said Letters Patent are hereby corrected as shown below:

Column 6, line 53, "ionizins" should read -- ionizing -- .

Column 12, line 50, "polybutadienne" should read
-- polybutadiene -- .

Columns 17-18, Table 1, Run No. 10, under the heading "Trademark (Oil Length)" for Run No. 10,"(285)" should read --(28%)-- .

Signed and Sealed this

Twenty-seventh Day of January 1981

[SEAL]

Attest:

RENE D. TEGTMEYER

Attesting Officer     Acting Commissioner of Patents and Trademarks

UNITED STATES PATENT AND TRADEMARK OFFICE
CERTIFICATE OF CORRECTION

PATENT NO. : 4,224,379
DATED : September 23, 1980
INVENTOR(S) : ISAO ICHINOSE, FUMIO MORI & GO KUNIMOTO It is certified that error appears in the above—identified patent and that said Letters Patent is hereby corrected as shown below:

Columns 19-20, Table 2,

Insert the following after the tabular entry run no. 21:

-- 22    kerosine    3.3    3.4    " --

Signed and Sealed this

Sixth Day of April 1982

[SEAL]

Attest:

GERALD J. MOSSINGHOFF

Attesting Officer        Commissioner of Patents and Trademarks